3,050,406
COATING MATERIAL ADDITIVE
Wesley N. Karlson, 1015 St. James Place, Park Ridge, Ill.
No Drawing. Filed Apr. 28, 1960, Ser. No. 25,244
12 Claims. (Cl. 106—14)

This invention relates to coating compositions in general and is directed in particular to a novel coating additive whereby the general utility and the physical and chemical properties of the coating are enhanced. In the coatings in which the additive of this invention is incorporated, the bonding and adherence, and the resistance to chemical agents to heat, to weathering, and to aging are improved.

The overall performance of coatings is affected by such factors as the quality of the coating material itself, the conditions under which the material is applied, the type of base surface to which it is applied, and the thickness of the deposited film. The longevity of the coating depends also upon the conditions under which the coating is applied. That is, such factors as temperature, humidity (and frost), and the surface itself are important considerations affecting the life of the coating.

Not all surfaces are equally suitable or receptive to the application of paints and other coatings. All other factors being fixed, the surface to which the coating is to be applied becomes an important consideration. For example, bonderized steel is a satisfactory surface to which to apply paint or other coating materials. Steel which is both galvanized and bonderized affords a somewhat better surface. Wood may be classified as a satisfactory surface. However, alkaline surfaces, such as plaster, concrete, cement block, and cement asbestos board are more difficult to coat and, in approved and accepted industrial practices, special procedures must be employed in order to apply an adhering coating to these types of surfaces.

The principal aims and objects of this invention are brought out in the paragraphs below wherein the novel features and the improvements realized are discussed.

It has become common practice to allow certain surfaces, such as plaster surfaces and concrete or cement surfaces to "age" before proceeding to apply a paint coating. During the aging period the alkalinity of the surface is reduced by reaction between the alkaline constituents present and the carbon dioxide in the air. In most instances, even after the "aging" step, it is necessary to use special sealing or priming compositions before applying the coating material. It is a principal object of this invention to obviate the need for carrying out the aging step and also to eliminate the need for special primers and sealers. In accordance with the practice of this invention it is feasible to apply a coating material, such as a paint or a varnish, etc., not only to ordinary bonderized metal surfaces, galvanized and/or bonderized steel, wood surfaces, etc., but also directly to alkaline surfaces such as plaster, cement, and concrete. Such surfaces have not heretofore been painted or varnished without carrying out special preliminary preparative or conditioning steps which are not only time consuming but result in increased costs.

Another material which ordinarily cannot be painted without extensive surface preparation is an oxidized metallic surface. In the usual practice, it is necessary not only to remove all loose deposits from the surface, but also to abrade the surface to remove mechanically the scale and the more firmly adhering rust or other metal oxides. Even when corroded metallic surfaces have been prepared as described, it is ordinarily necessary to use a primer or sealer coat before applying the final paint or varnish coating material. In the absence of a special primer coat, the final coating ordinarily exhibits very poor adhesion, tends to blister and to chip, and is short lived. And even when primers are used, the adherence of paint films to oxidized metallic surfaces is poor.

Thus, it is a further object of this invention to eliminate this prior art shortcoming, and, in accordance with this invention, it is possible to apply directly to corroded metal surfaces a final coating having good bonding and adhesion characteristics. The only preliminary treatment required is the removal of any loosely adhering oxides and foreign matter; and no primers or sealers are needed.

The additive of this invention is useful and beneficial in any of the conventional coating materials including paints, varnishes, and lacquers, etc. And the paints in which the additive finds utility include solvent and oil base paints, water base paints, and emulsion type paints.

Coating compositions in which are incorporated the additive of this invention have the unusual property that the final films produced are resistant to high temperatures. And, for example, when added to aluminum paint formulations, the resulting coating composition withstands temperatures up to about 1000° F. without undergoing significant deterioration. Thus, it is an additional object of the present invention to make possible the formulation of coating compositions which have improved properties as regards heat sensitivity.

An additional important feature or property of the dry paint films containing the additive of this invention is that these films exhibit markedly reduced flammability as compared with paints in which the additive is absent.

Coating compositions have differing degrees of flexibility and different capacities for resisting fracture upon being subjected to flexing or bending. Paints and other coating compositions containing the additive of this invention show improved resistance to fracture, even at low temperatures. It is a purpose of this invention to improve the fracture resistance and the bonding of coatings.

Certain classes of coating compositions, particularly the emulsion type paints, have inherent corrosive properties so that, ordinarily, the formulated paint cannot be shipped in unlined metal containers. It is an important advantage of the coating compositions which include the additive of this invention that the formulations are not corrosive and that they can be stored satisfactorily and shipped in ordinary unlined metal containers. The additive itself functions as an effective corrosion inhibiting agent, and its inclusion in emulsion paint formulations affords not only greater convenience in handling the finished product but also results in considerable cost savings where containers are concerned.

The additive of the present invention has the further advantage that when used in coating compositions, it is effective to remove gases from the surface of the material being painted or coated. If not completely removed, these gases are trapped beneath the paint film and cause subsequent underfilm corrosion, lifting of the film, and failure of the coating. The trapping of gases in the surfaces of the metal to be coated is a principal cause of underfilm corrosion with its associated film blistering and peeling. The incorporation of the additive of this invention in coating formulations is effective to remove these surfaces gases and to prevent the corrosion and film lifting and peeling which so commonly occur.

The removal of surface gases from the material being coated enables the paint or other coating material to penetrate more effectively into the pits and pores of the surface being coated, and the bonding of the final film to the surface is enhanced thereby and the adherence greatly improved. It is thus an additional aim of the present invention to remove surface gases from the material being coated and to effectuate thereby more effective penetration of the coating into the irregularities of the surface and to realize improved bonding and adherence of the final film and to prevent underfilm corrosion and film blistering and peeling.

The final coating films of formulations made in accordance with the teaching of this invention, and including the additive of this invention, exhibit improved resistance to flame and to high temperatures, decreased sensitivity to temperature fluctuations, increased resistance to flexing fracture, improved adherence and bonding, and markedly improved resistance to both acidic and alkaline agents. Paint films incorporating the additive of this invention and tested using accepted salt spray procedures and other conventional techniques have exceptional physical and chemical properties and outstanding ability to withstand extended exposure.

A preferred embodiment of the present invention is a coating additive which includes a water-soluble polyphosphate, monosodium phosphate, sodium acid pyrophosphate, and sodium sulfite. Each of these components fulfills a definite role in the over-all composition, but for particular applications it is possible to omit one or more of the ingredients listed above.

The exact concentration of each of the ingredients in the preferred embodiment of the coating additive is not highly critical but may be varied within certain limits. The formulation of Table I is particularly well suited for the general purposes of this invention, although in specific instances other percentage compositions have special advantages.

TABLE I

| | Percent |
|---|---|
| Sodium polyphosphate | 60 |
| Monosodium phosphate | 20 |
| Sodium acid pyrophosphate | 10 |
| Sodium sulfite | 10 |

The components of the additive are introduced into the coating composition preferably in the form of an aqueous concentrate, although it is possible, especially in cases of water base paints and emulsion type paints, to add the ingredients as powders directly to the coating composition. The aqueous concentrate, which is the preferred form of the additive, is prepared by adding 1 part by weight of the solids to 2 parts by weight of water, and it has been found, for example, that the addition of 1 ounce of the chemical mixture to 2 ounces of water gives about 2 ounces (by volume) of the concentrate. The water used in preparing the aqueous concentrate should preferably be distilled water or chemically softened water, such as zeolite treated water, and, if desired, the final solution may be filtered to obtain a polished product. The dissolution of the chemicals in the water phase is facilitated if the solution is heated.

The following examples, as tabulated below in Table II, are illustrative of compositions of a preferred embodiment of the additive which fall within the scope of the invention. All parts listed are by weight.

TABLE II

| | 1 | 2 | 3 | 4 | 5 |
|---|---|---|---|---|---|
| Sodium polyphosphate | 75 | 60 | 50 | 50 | 60 |
| Monosodium phosphate | 10 | 10 | 20 | 15 | 20 |
| Sodium acid pyrophosphate | 10 | 20 | 15 | 15 | 10 |
| Sodium sulfite | 5 | 10 | 15 | 20 | 10 |

The polyphosphate used in the preferred embodiment of the invention is a molecularly dehydrated phosphate having a metal oxide to $P_2O_5$ ratio of between about 1:1 and 2:1. Such products are available commercially as hexametaphosphates, sodium polyphosphate, or as sodium polyphos (Blockson Chemical Company, a Division of Olin Mathieson Chemical Corp.). Polyphosphates with a $Na_2O$ ratio of about 1.34:1 are preferred.

It is believed that the polyphosphate acts principally as a complexing agent for alkaline earth metals such as calcium. The monosodium phosphate acts principally as a complexing agent for iron and related metals. The sodium acid pyrophosphate fulfills the function of a phosphatizing agent and also as a complexing agent for iron and other metals. The phosphates also perform a buffering action and render the final product less sensitive to acids and to alkali. In addition, the flame resistant characteristics of the final dried film are probably attributable to the phosphates of the additive. The sodium sulfite functions as a reducing agent and to remove dissolved and/or physically associated oxygen and other gases from the coating composition and from the surface being coated.

Many chemical reagents and substances, such as steel scrap and turnings, iron powder, various hydroxides, and certain organic materials such as glucosides have found use as agents to remove dissolved or associated oxygen by reacting with it chemically. However, for the preferred composition of this invention, sodium sulfite has particular utility as an oxygen reactive and scavenging agent.

The phosphatizing properties of the monosodium phosphate and the sodium acid pyrophosphate are particularly important in those coating compositions which are applied to metallic surfaces. In this connection the sodium sulfite is also important, especially where the metallic surface is corroded, pitted, or contains a scale or an oxide deposit.

The concentration of additive to be used in any particular coating composition will depend to a certain extent on the type of coating composition and upon its intended use. A good general coating composition incorporating the additive of this invention is obtained by using two ounces of liquid concentrate (containing one ounce of solid ingredients) for each gallon of paint. In other instances where the surface to be coated does not present particular problems, lower concentrations can be used effectively. In different situations, as for example, those in which the final film is subject to more destructive agents, somewhat higher concentrations should be used. The following examples will serve to indicate the ranges of concentrations to be used in several specific instances. In applying a coating composition to non-oxidized steel, good results are obtained if about 2 ounces of liquid concentrate are added to each 25 gallons of paint. In the coating of oxidized steel, on the other hand, a higher concentration of the additive should be used, and it has been found that addition of the liquid concentrate at the rate of 2 ounces for each gallon of paint gives good results. This concentration has also been found adequate to protect unlined cans from attack by emulsion type paints. In coating steel which is subject to contact with sea water the additive of this invention may be used effectively at still higher concentrations and a concentration of about 2½ ounces of liquid concentrate per gallon of coating material has proved satisfactory. And in the painting of alkaline surfaces, such as plaster, concrete, cement block, and cement asbestos board, the additive of this invention should be used at a concentration of about 1 ounce of liquid concentrate per 25 gallons of coating material although in some instances higher concentrations are useful. When applying the coating material to new or "raw" plaster higher concentrations of additive are recommended. Those skilled in the art will, in the light of this disclosure, be able to make modifications in both the composition and the concentration of the additive without departing from the spirit of the invention.

The additive has wide application in the field of coating compositions and is used advantageously in solvent base paints, sealers, lacquers, water base paints and emulsion type paints. The addition of the additive in the form of a concentrated solution to water base paints and to emulsion type paints may cause a slight thickening of the final coating composition. There is, however, no coagulation or gelling and the additive produces no undesirable effects when added to these classes of coating compositions. The water base and emulsion type paints containing the additive of this invention exhibit good stability and shelf life. In addition, these coating compositions are much less corrosive than untreated coatings of this class and it has been found that water base and emulsion paints containing the additive of the invention can be stored and shipped in unlined metal containers, the components of the additive being effective to act as corrosion inhibiting agents.

The aqueous concentrate is used effectively not only in combination with the aqueous and emulsion type paints but also with solvent and oil base paints, sealers, and lacquers. In accordance with the practice of this invention it is possible to add, for example, two liquid ounces (60 cc.) of the additive concentrate containing 1 ounce of the solid mixture directly to a prepared paint composition of the solvent type without causing any coagulation or phase separation. The final product, consisting of the paint plus the additive concentrate, is stable and has a good shelf life.

Coating compositions containing the additive of the invention are particularly useful in the coating of metal surfaces which are oxidized, corroded, pitted, or which contain rust or scale deposits. In accordance with the practice of the invention it is possible to coat such surfaces with compositions containing the additive, and it is unnecessary to use special primers or sealers. Not only do the coating compositions containing the additive form a unique protective film over the metal surface and remove occluded surface gases therefrom thus permitting the coating material to penetrate into the pits and pores of the metal, but these compositions are also effective to seal out atmospheric gases which might otherwise contribute to the corrosion of the metal surface.

In addition to the particular utility of the additive in compositions for coating metal surfaces, the compositions containing the additive are especially useful in coating alkaline surfaces such as plaster, concrete, cement block, and cement asbestos board and, in contrast with the ordinarily used procedure, it is possible to coat such surfaces without subjecting them to either an aging period and/or a primer or sealer product. Coating compositions which include the additive of the invention exhibit excellent bonding and adhesion to these alkaline surfaces and obviate many of the difficulties which have heretofore existed in the coating of such surfaces. Coating compositions containing the additive of the invention can be applied successfully even to raw plaster.

The following examples will illustrate coating compositions typical of those in which the additive of this invention may be incorporated advantageously. The compositions depicted are presented not as an exhaustive list, but merely to illustrate some of the types of formulations in which the additive has been incorporated successfully. It will be obvious that the additive of the invention has equal applicability and utility in all types of coating compositions, and relying on this disclosure, those skilled in the art will be able to adapt the invention to any of the numerous coating compositions well known in the art.

Example A, below, represents a typical oil base or solvent base paint formulation in which the additive of the invention may be incorporated. The formula is for 100 gallons of coating material and the additive of the invention is added to the final finished mix. The concentration of additive in the final preparation will be dictated by the intended use of the composition, although for general purposes, the concentrate of the invention should be added at the rate of about two gallons per 100 gallons of paint.

EXAMPLE A

Flat Wall Paint

[Oil base or solvent base type]

|  | lbs. | gals. |
|---|---|---|
| Rutile titanium calcium pigment | 276 | 10.2 |
| Lithopone | 414 | 11.6 |
| Calcium carbonate | 138 | 6.1 |
| Magnesium silicate | 69 | 2.9 |
| Aluminum stearate gel | 56.5 | 8.6 |
| Bleached linseed oil | 16.8 | 2.2 |
| Blown linseed oil | 44.2 | 5.4 |
| Kettle bodied linseed oil | 43.1 | 5.4 |
| 25 gal. ester gum—castor oil varnish (45% solids) | 173.5 | 23.7 |
| Kerosene | 162 | 23.7 |
| 24% Lead naphthenate | 0.97 | 0.1 |
| 6% Cobalt naphthenate | 0.40 | 0.05 |
|  | 1,194.5 | 100 |

Two gallons of the liquid concentrate additive of the invention should be added to the prepared paint composition.

Formulae for additional oil base or solvent base paints, including flat paints, semi-gloss, and gloss paints for both exterior and interior use may be found in standard paint references, in government publications such as Federal Specification TT-P-40, Ordnance Specification 3-175A, etc., and in reference texts such as Paint and Varnish Technology, by William von Fischer, Reinhold Publishing Corp. (1948).

EXAMPLE B

Gloss Wall Paint

[Oil base or solvent base type]

|  | lbs. | gals. |
|---|---|---|
| Lithopone | 344 | 9.65 |
| Rutile titanium calcium pigment | 243 | 8.98 |
| Kettle bodied linseed oil | 122 | 15.20 |
| Ester gum solution (65% solids) | 41.5 | 5.1 |
| 25 gal. wood oil varnish (43% solids) | 369 | 50.6 |
| Mineral spirits | 66.4 | 10.2 |
| 24% Lead naphthenate | 2.0 | 0.21 |
| 6% Cobalt naphthenate | 0.8 | 0.1 |
|  | 1,188.7 | 100 |

Two gallons of the liquid concentrate additive of the invention should be added to the prepared paint composition.

The foregoing examples are formulations of coating compositions of the solvent base or oil base type and including the additive of the invention. The additive may be incorporated similarly in lacquers, varnishes, sealers, primers, etc.

The additive of the invention may be used not only in oil base or solvent base paints, etc., but also in water base paints and in the broad class of coating compositions known as emulsion type paints and which includes resin emulsion paints and latex emulsion paints. These emulsion paints, particularly of the oil-in-water type emulsion, have found increasing acceptance in recent years. The appeal of these products stems from many properties among which are their excellent application characteristics, rapid drying, good hiding power. In addition, these preparations are practically devoid of paint odor. This valuable property is due, at least in part, to the ability of the protein component of the aqueous phase to tie up the oxidation products of the oil phase. Another appealing feature of the oil-in-water emulsion paints is the ease with which the brushes and containers can be cleaned after use, and the ease with which "spills" can be cleaned up.

The following examples of emulsion type paints are typical of those in which the additive of the invention may be incorporated. Additional formulations may be found in standard paint reference material, in government publications such as Federal Specification TT-P-88, Paint, Resin Base Emulsion, and in texts such as Organic Protective Coatings, by von Fischer and Bobalek, Reinhold Publishing Corp. (1953).

EXAMPLE C

*Flat Paint*

[Emulsion type]

| | Lbs. |
|---|---|
| Rutile titanium dioxide pigment | 75 |
| Rutile titanium calcium pigment | 525 |
| Diatomaceous silica | 100 |
| Linseed oil-ester gum varnish, 40 gal. length (cold cut of ester gum in 9–12 acid value linseed oil) | 186 |
| Sulfonated castor oil, 75% solids (emulsifying agent for varnish) | 30.8 |
| Surface active agent for pigment (polyethylene oxide condensates) | 22.3 |
| 10% sodium hydroxide solution (to form soaps and to preserve neutrality of emulsion which tends to break at low pH) | 22 |
| 3% methyl cellulose solution (protective colloid) | 238 |
| 24% lead naphthenate (drier for oil) | 9.7 |
| 6% cobalt naphthenate (drier for oil) | 2.4 |
| Water | 100 |
| | ¹1311 |

¹ 100 gals.

Two gallons of the liquid concentrate additive of the invention should be added to the prepared emulsion type paint.

The formula in Example D is for an alkyd type of oil-in-water emulsion paint (interior white). The additive of the invention is added to the final prepared mix. The amount to be added will depend upon the ultimate use conditions.

EXAMPLE D

*Interior White*

[Alkyd type emulsion paint]

| | Lbs. |
|---|---|
| Titanium dioxide (water dispersible) | 300 |
| Barium titanium pigment | 200 |
| Colloidal silica | 150 |
| Flake mica | 50 |
| Alkyd emulsion | 200 |
| Water | 450 |
| | ¹1250 |

¹ 100 gals.

Two gallons of the liquid concentrate additive of the invention should be added to the prepared emulsion paint.

Example E represents an oil-in-water latex type of emulsion paint typical of the class in which the additive of the invention finds utility.

EXAMPLE E

*Latex Paint*

[Oil-in-water emulsion]

| | Parts by weight |
|---|---|
| Lithopone | 60 |
| Titanium dioxide | 10 |
| China clay | 30 |
| 4% aqueous solution of 100 cps. methocel | 35 |
| Styrene and butadiene latex emulsion (50% solids) (e.g. "Dow Latex 512") | 40 |
| Preservative (phenol derivative) (e.g. "Dowicide G") | 4 |
| Monoethanolamine oleate | 0.6 |
| Ethyl alcohol | 0.6 |
| Pine oil | 0.3 |
| Tributyl phosphate | 1.0 |
| Sodium alkyl sulfate wetting agent ("Tergitol 4T," Union Carbide Corp.) | 1.0 |

The additive of the invention may be added in an aqueous concentrate at the rate of about 1 part of solids per 100 parts of the prepared latex emulsion coating material.

Although the preferred embodiment of the additive of this invention includes the polyphosphate, monosodium phosphate, pyrophosphate and sodium sulfite, not all of these ingredients are essential for all coating applications. When the coating composition containing the additive of this invention is used on non-metallic surfaces, the metal complexing properties and the phosphatizing properties of the monosodium phosphate and the sodium acid pyrophosphate become less significant and it is possible to reduce the concentrations of these components and in certain instances to eliminate one or both. In other applications in which the ability of the polyphosphate to complex alkaline earth metals, etc., is not required, the concentration of this ingredient may be reduced or it may be omitted from the coating composition. In still other applications, particularly those in which the coating composition is applied to normal surfaces offering no particular problems, it is possible to reduce the concentration of the sodium sulfite. And in some instances in which the gas absorbing properties of the sodium sulfite are unnecessary, this component may be omitted from the additive. It has been found that while the preferred embodiment includes all of these components, not all may be essential in a given particular application. However, in such cases the inclusion of all of the components produces no deleterious results.

While a number of applications and the preferred embodiment of the invention have been described, many details may be varied within a wide range and equivalent chemical materials may be employed without departing from the principles of the invention. It is to be understood that the invention is not to be limited to the applications described or to its preferred embodiment, but that the invention may be otherwise embodied and practiced within the spirit and scope of the appended claims.

I claim:

1. An additive for incorporation in film forming coating compositions of the type including lacquers, sealers, solvent base paints, oil base paints, water base paints, and resin emulsion and latex emulsion paints, said additive comprising a mixture of chemicals consisting of essentially about 60% sodium polyphosphate, 20% monosodium phosphate, 10% sodium acid pyrophosphate and 10% of a reducing agent, said additive being effective to render the final coating film improved with respect to bonding and adherence characteristics and with respect to resistance to weathering, aging and to chemical agents.

2. A coating material additive for incorporation in film-forming coating compositions of the type including lacquers, sealers, solvent-base paints, oil-base paints, water-base paints, and resin emulsion and latex type paints, said additive consisting essentially of a mixture of chemicals comprising about 50–75 percent sodium polyphosphate, 10–20 percent monosodium phosphate, 10–20 percent sodium acid pyrophosphate and 5–20 percent sodium sulphite, said additive being effective to render the final coating film improved with respect to bonding and adherence characteristics and with respect to resistance to weathering, aging, and to chemical agents.

3. An alkali resistant composition of matter suitable for application to raw plaster surfaces and other alkaline surfaces including concrete, cement block, and cement asbestos board, and comprising a film-forming coating composition in combination with an additive consisting essentially of an aqueous concentrate having dissolved therein a composition consisting essentially of from about 50 to about 75 percent of a water-soluble glassy polyphosphate, from about 10 to about 20 percent of monosodium phosphate, from about 10 to about 20 percent of sodium acid pyrophospate, and from about 5 to about 20 percent of a reducing agent.

4. A film forming coating composition additive consisting essentially of from about 80 to about 90 percent of water-soluble phosphates and from about 5 to about 20 percent of a reducing agent.

5. In a film forming coating composition, the improvement comprising an additive to render the film of said film forming coating composition more firmly adherent to corroded metallic surfaces and to alkaline surfaces and to provide increased resistance of said film to deterioration resulting from chemical agents, said additive consisting essentially of a mixture of chemical agents including from about 50 to about 75 parts by weight of a water-soluble glassy polyphosphate, from about 10 to about 20 parts by weight of monosodium phosphate, from about 10 to about 20 parts by weight of sodium acid pyrophosphate, and from about 5 to about 20 parts by weight of sodium sulfite.

6. In the application of a film forming coating composition to cover corroded and pitted metal surfaces having oxidizing surface gases associated therewith, the improvement which comprises incorporating from about 0.001 percent to about 1.0 percent of a chemical reducing agent in said film forming composition to remove said surface gases by reaction therewith and to render the film formed by said film forming composition more firmly adherent to said metal surfaces.

7. A coating material additive for film-forming coating compositions, said additive consisting essentially of from about 50 to about 75 percent of water-soluble glassy polyphosphate, from about 10 to about 20 percent of monosodium phosphate, from about 10 to about 20 percent of sodium acid pyrophosphate, and from about 5 to about 20 percent of a reducing agent.

8. In a film-forming solvent-type coating composition, the improvement consisting of an additive to render the ultimate film-forming coating more firmly adherent to oxidized metallic surfaces and to alkaline surfaces and more resistant to chemical agents, said additive consisting essentially of an aqueous concentrate of a combination of chemical agents in the ratio of from about 50 to about 75 parts by weight of a water-soluble glassy polyphosphate, from about 10 to about 20 parts by weight of monosodium phosphate, from about 10 to about 20 parts by weight of sodium acid pyrophosphate, and from about 5 to about 20 parts by weight of a reducing agent.

9. As a new composition of matter, the combination of a film-forming composition selected from the group consisting of oil base, asphalt base, solvent base, water base, and emulsion-type film-forming coating compositions with an aqueous concentrate consisting essentially of a water solution of a combination of chemical agents in the ratio of about 80 to about 95 parts by weight of water-soluble phosphate compounds and from about 5 to about 20 parts by weight of a reducing agent, and characterized by improved bonding, adherence, and by improved physical, chemical and aging properties.

10. In the method of applying a film-forming coating composition to an alkaline surface of the type including plaster, concrete, cement blocks and asbestos board, the improvement which consists in rendering said coating composition compatible with said surface and which constitutes incorporating in said coating composition an additive consisting essentially of a combination of chemical agents in the ratio of about 80 to about 95 percent of water-soluble phosphates and from about 5 to about 20 percent of a reducing agent, said additive being effective to render the final applied film firmly adherent and resistant to aging and to chemical agents.

11. In the method of applying a film-forming coating composition to oxidized, pitted and corroded metallic surfaces, the improvement which consists in rendering said coating composition adherent and constitutes incorporating in said coating composition a chemical additive consisting essentially of a combination of chemical agents in the ratio of about 80 to about 95 percent of water-soluble phosphate and from about 5 to about 20 percent of a reducing agent, said reducing agent being an effective oxygen-scavenging agent, and said additive being effective to render the final applied film firmly adherent and resistant to aging and to chemical agents.

12. In the storing and shipping of water-base and emulsion-type film-forming coating composition in unlined metal containers, an improvement rendering said coating compositions less corrosive to said metal containers, said improvement consisting in incorporating in said coating composition an additive consisting essentially of from about 80 to about 95 parts by weight of water-soluble phosphates and from about 5 to about 20 parts by weight of an oxygen-reactive reducing agent.

References Cited in the file of this patent

UNITED STATES PATENTS

| | | |
|---|---|---|
| 1,329,386 | Emhardt | Feb. 3, 1920 |
| 1,990,811 | Zimmerman | Feb. 12, 1935 |
| 2,371,866 | Barrett | Mar. 20, 1945 |
| 2,609,308 | Gibson | Sept. 2, 1952 |
| 2,758,949 | Ley et al. | Aug. 14, 1956 |

FOREIGN PATENTS

| | | |
|---|---|---|
| 819,190 | Great Britain | Sept. 2, 1959 |
| 821,968 | Great Britain | Oct. 14, 1959 |

UNITED STATES PATENT OFFICE
CERTIFICATE OF CORRECTION

Patent No. 3,050,406                          August 21, 1962

Wesley N. Karlson

It is hereby certified that error appears in the above numbered patent requiring correction and that the said Letters Patent should read as corrected below.

Column 9, line 4, for "90" read -- 95 --.

Signed and sealed this 8th day of January 1963.

(SEAL)
Attest:

ERNEST W. SWIDER                          DAVID L. LADD
Attesting Officer                            Commissioner of Patents